No. 857,979. PATENTED JUNE 25, 1907.
W. LE R. BRYANT.
TACHOMETER.
APPLICATION FILED OCT. 4, 1906.
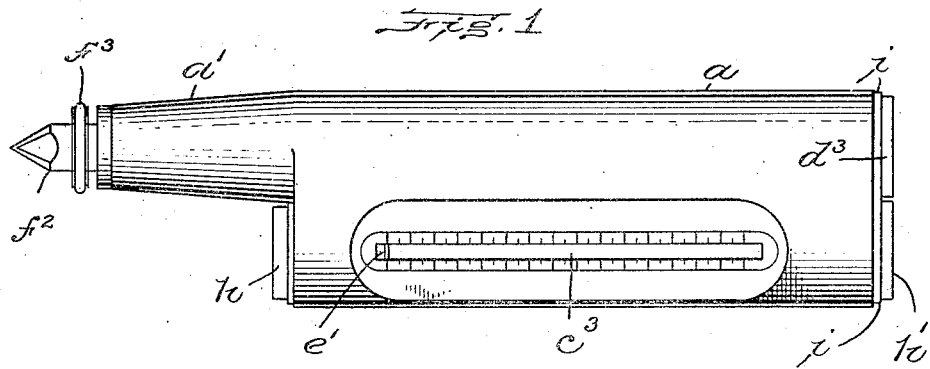
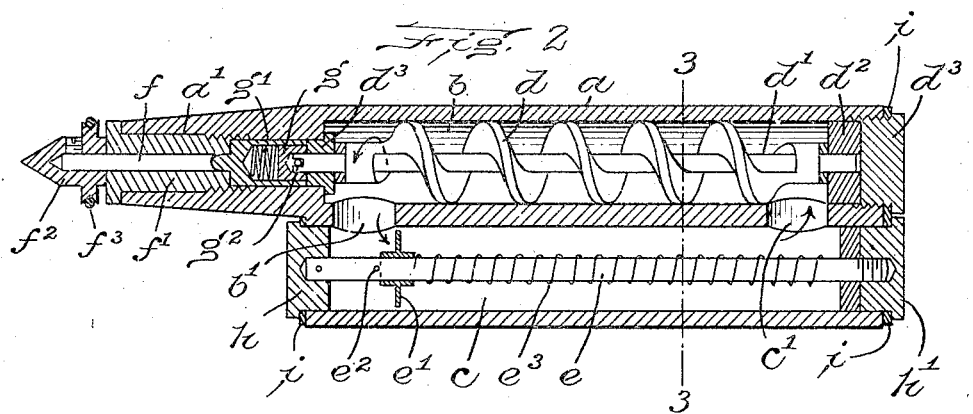
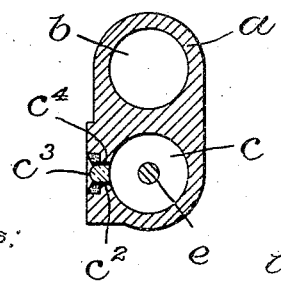
Witnesses:
E. Batchelder
A. L. Folsom.
Inventor
W. LeRoy Bryant
by Wright Brown Quinby May
Attorneys

UNITED STATES PATENT OFFICE.

WILLIAM LE ROY BRYANT, OF SPRINGFIELD, VERMONT.

TACHOMETER.

No. 857,979.

Specification of Letters Patent.

Patented June 25, 1907.

Application filed October 4, 1906. Serial No. 337,465.

*To all whom it may concern:*

Be it known that I, WILLIAM LE ROY BRYANT, of Springfield, in the county of Windsor and State of Vermont, have invented certain new and useful Improvements in Tachometers, of which the following is a specification.

This invention has relation to instruments for measuring speed or velocity and is designed to indicate the rate of speed or rapidity at which a wheel or cylinder is revolving, being applicable with equal advantage to work being finished in machine tools and to the wheels of vehicles, automobiles, railroad trains, etc.

The object of the invention is to provide a simple, accurate tachometer, in which the number of parts is reduced to a minimum and in which there is small likelihood of the parts becoming worn or injured.

Referring to the accompanying drawings:—Figure 1 represents an instrument of the character referred to embodying my invention. Fig. 2 represents a longitudinal section through the same. Fig. 3 represents a section on line 3—3 of Fig. 2 with the screw pump removed.

The instrument consists of a casing $a$ in which there are two parallel cylindrical chambers $b$ $c$ which are respectively connected at their ends by open ports $b'$ $c'$. Within the chamber $a$, there is a rotatable screw pump $d$ to which motion is imparted from the moving element whose speed it is desired to ascertain. This screw fits accurately in the chamber $b$ so that, when it is rotated, it will cause a fluid of proper consistency and composition to circulate through the chambers $b$ and $c$. Arranged in the chamber $c$ and in the axial line thereof, there is a guide rod $e$ upon which is adapted to slide a float or piston $e'$. This piston is held yieldingly and normally (when the screw is at rest) against a stop $e^2$ on the rod $e$ by means of a helical spring $e^3$. The external diameter of the piston is less than the internal diameter of the chamber so that a proper amount of fluid may escape past it. When the screw is rotated in the direction indicated by the arrow, it forces the liquid outward through the port $b'$ into the chamber $c$ and moves the piston to the right in said chamber until the pressure of the spring $e^3$ off-sets or counter-balances the pressure of the liquid; whereupon the piston remains stationary so long as the screw rotates at an even speed. The screw operates not only to force the liquid into the chamber $c$ through the port $b'$, but at the same time it draws the liquid from the other side of the piston in the chamber $c$ through the port $c'$ into chamber $b$; thus exerting a double force upon the piston to move it in its chamber against pressure of the spring $e^3$. By this construction and arrangement, the screw may be said to act upon both sides of the piston simultaneously and consequently there is a quick and accurate response by the piston to any slight movement of the screw, making it possible to indicate accurately slow speeds as well as high speeds.

In order that the position of the piston may be observed, the wall of chamber $c$ is longitudinally slotted as at $c^2$, and in the slot is inserted a strip of glass $c^3$, the sides of which are coated with reflecting material such as mercury, platinum, or the like, as indicated at $c^4$. The outer face of the glass strip may also be convex so that the edge of the piston will be magnified and thus be perfectly visible to an observer. Along the strip $c^3$ is a graduated scale as shown in Fig. 1, with numerals (not shown) indicating the speed of the element being measured as indicated by the position of the piston.

As a matter of construction, the screw shaft $d'$ is journaled at one end in a block $d^2$ inserted in one end of the chamber $b$, and the other end of the screw rod is journaled in a bearing seat $d^3$ which is driven into the inner end of an aperture through the end wall of the casing.

$f$ indicates a shaft which is arranged in axial alinement with the screw shaft and which is journaled in a sleeve or bushing $f'$, screwed into an extension $a'$ at one end of the casing. Upon its outer end, said shaft carries a small wheel $f^2$, the periphery of which is shod with rubber as indicated at $f^3$. The hub of the wheel is pointed and cut away so that it may be inserted in an aperture in the axis of a rotating part to measure its speed of rotation. The inner end of the shaft $f$ is enlarged and socketed to receive a thimble $g$ which is held by a spring $g'$ against the bearing seat $d^3$ to prevent the leakage of the fluid by or past the drive shaft $f$. A small pin $g^2$ is driven through the thimble so that its ends project into slots (not shown) in the end of the drive shaft, and the thimble itself is recessed so that the slotted end of the screw shaft $d'$ may engage said pin as shown in Fig.

By this construction, power is transmitted from the shaft $f$ to the screw shaft $d'$ and at the same time the thimble is free to adjust itself against the face of the bearing $d^3$ to form a close running joint.

The end of the chamber $a$ is closed by the bearing $d^2$ and by a screw plug $d^3$. Similar screw plugs may be used to close the ends of the chamber $c$. For convenience, however, the plugs $h$ $h'$ are driven friction-tight into place, the rod $e'$ which is pinned to the block $h$, being screwed into a threaded recess in the plug $h'$. It will be understood that the packing rings, as indicated at $i$, will also be inserted between the flanges on the plugs and the ends of the casing to prevent the escape of fluid.

A tachometer or speedometer constructed as herein described, possesses numerous advantages due to its compact arrangement and simplicity of construction, which contribute to render the instrument accurate and convenient. It has a minimum number of working parts, thus greatly reducing the chance of error due to wear of the parts. Furthermore, the instrument, as illustrated, may be manufactured economically so as to produce it at a normal cost.

Having thus explained the nature of the said invention and described a way of constructing and using the same, although without attempting to set forth all of the forms in which it may be made, or all of the modes of its use, I declare that what I claim is:—

1. A tachometer comprising a casing containing parallel chambers, connected at their ends by ports, and adapted to receive a fluid, a rotary screw in one of said chambers adapted to be rotated by the element whose speed is to be measured to effect a circulation of fluid through said chambers, a spring pressed piston in the other chamber, and means by which the position of the piston may be indicated.

2. A tachometer comprising a casing containing parallel cylindrical chambers connected at their ends by open ports, a screw fitting in one of said chambers and adapted to be rotated by the element whose speed is to be measured to effect the circulation of the fluid through said chamber and ports, a guide rod in the other of said chambers, a piston adapted to slide on said rod and being of less diameter than the chamber to permit the fluid to escape past it, a spring bearing against said piston, and means by which the position of the piston may be observed.

3. A tachometer comprising a casing containing parallel cylindrical chambers connected at their ends by open ports, a screw fitting in one of said chambers and adapted to be rotated by the element whose speed is to be measured to effect the circulation of the fluid through said chambers and ports, and a spring pressed piston in the other of said chambers adapted to be moved against the pressure of the spring by the pressure of the fluid, and less in diameter than the chamber to permit the fluid to flow past it, there being in the last-mentioned chamber a glazed slot to permit observation of the position of the piston.

4. A tachometer comprising a casing containing parallel chambers, connected at their ends by ports, and adapted to receive a fluid, a rotary screw in one of said chambers adapted to be rotated by the element whose speed is to be measured to effect a circulation of fluid through said chambers, a spring pressed piston in the other chamber, means by which the position of the piston may be indicated, a shaft for transmitting power to the screw alined therewith, a bearing for said screw, and a spring pressed thimble adjacent said bearing, substantially as described, to prevent the escape of the fluid.

In testimony whereof I have affixed my signature, in presence of two witnesses.

WILLIAM LE ROY BRYANT.

Witnesses:
 ROBERT R. FINN,
 F. P. LOVEJOY.